United States Patent
Saraidaridis et al.

(10) Patent No.: US 11,271,226 B1
(45) Date of Patent: Mar. 8, 2022

(54) REDOX FLOW BATTERY WITH IMPROVED EFFICIENCY

(71) Applicant: Raytheon Technologies Corporation, Waltham, MA (US)

(72) Inventors: James D. Saraidaridis, Hartford, CT (US); Michael L. Perry, Groton, CT (US); Robert Mason Darling, South Windsor, CT (US)

(73) Assignee: Raytheon Technologies Corporation, Waltham, MA (US)

( * ) Notice: Subject to any disclaimer, the term of this patent is extended or adjusted under 35 U.S.C. 154(b) by 0 days.

(21) Appl. No.: 17/119,427

(22) Filed: Dec. 11, 2020

(51) Int. Cl.
*H01M 8/04186* (2016.01)
*H01M 8/18* (2006.01)
*H01M 8/08* (2016.01)
*H01M 8/04082* (2016.01)

(52) U.S. Cl.
CPC ... *H01M 8/04186* (2013.01); *H01M 8/04201* (2013.01); *H01M 8/08* (2013.01); *H01M 8/188* (2013.01); *H01M 2300/0002* (2013.01)

(58) Field of Classification Search
CPC .............. H01M 8/04186; H01M 8/08; H01M 8/04201; H01M 8/188; H01M 2300/0002
See application file for complete search history.

(56) References Cited

U.S. PATENT DOCUMENTS

| | | | |
|---|---|---|---|
| 3,152,013 | A | 10/1964 | Juda |
| 3,245,836 | A | 4/1966 | Agruss |
| 4,053,684 | A | 10/1977 | Zito, Jr. et al. |
| 4,124,478 | A | 11/1978 | Tsien et al. |

(Continued)

FOREIGN PATENT DOCUMENTS

| | | |
|---|---|---|
| CN | 1845368 | 10/2006 |
| CN | 101325252 | 12/2008 |

(Continued)

OTHER PUBLICATIONS

Darling, R., Gallagher, K., Xie, W., Su, Liang, and Brushett, F. (2016). Transport property requirements for flow battery separators. Journal of the Electrochemical Society, 163 (1). pp. A5029-A5040.
Escribano, S., Blachot, J-F., Etheve, J., Morin, A., and Mosdale, R. (2006). Characterization of PEMFCs gas diffusion layers properties. Journal of Power Sources 156. pp. 8-13.

(Continued)

*Primary Examiner* — Stewart A Fraser
(74) *Attorney, Agent, or Firm* — Carlson, Gaskey & Olds, P.C.

(57) ABSTRACT

A method for a redox flow battery includes using a cell of a redox flow battery to store electrical energy and discharge the stored electrical energy. The using includes circulating a first electrolyte solution through a first circulation loop in fluid connection with the first electrode of the cell; circulating a second electrolyte solution through a second circulation loop in fluid connection with the second electrode of the cell; and at least one of a first element from the first electrolyte solution in the first electrode permeates through the separator layer and precipitates as a first solid product in the second electrode and a second element from the second electrolyte solution permeates through the separator layer and precipitates a second solid product in the first electrode. The method also includes removing at least a portion of the first solid product or the second solid product from the first electrode and the second electrode, respectively.

20 Claims, 4 Drawing Sheets

(56) References Cited

U.S. PATENT DOCUMENTS

| | | |
|---|---|---|
| 4,180,623 A | 12/1979 | Adams |
| 4,407,902 A | 10/1983 | Kummer et al. |
| 4,786,567 A | 11/1988 | Skyllas-Kazacos et al. |
| 5,188,911 A | 2/1993 | Downing et al. |
| 5,270,132 A | 12/1993 | Breault et al. |
| 5,298,341 A | 3/1994 | Khandkar et al. |
| 5,318,865 A | 6/1994 | Kaneko et al. |
| 5,612,148 A | 3/1997 | Zito |
| 5,648,184 A | 7/1997 | Inoue et al. |
| 5,830,603 A | 11/1998 | Oka et al. |
| 5,851,694 A | 12/1998 | Miyabayashi et al. |
| 6,007,933 A | 12/1999 | Jones |
| 6,309,532 B1 | 10/2001 | Tran et al. |
| 6,355,373 B1 | 3/2002 | Pauling |
| 6,416,899 B1 | 7/2002 | Wariishi et al. |
| 6,472,095 B2 | 10/2002 | Margiott |
| 6,476,583 B2 | 11/2002 | McAndrews |
| 6,522,919 B1 | 2/2003 | Flower et al. |
| 6,628,085 B2 | 9/2003 | Fang |
| 6,692,862 B1 | 2/2004 | Zocchi |
| 6,828,055 B2 | 12/2004 | Kearl |
| 6,841,294 B1 | 1/2005 | Morrissey et al. |
| 7,105,245 B2 | 9/2006 | Ohlsen et al. |
| 7,199,550 B2 | 4/2007 | Tsutsui et al. |
| 7,250,229 B2 | 7/2007 | Yang et al. |
| 7,410,712 B2 | 8/2008 | Reiser et al. |
| 7,527,886 B2 | 5/2009 | Fuller et al. |
| 7,790,303 B2 | 9/2010 | Fredette |
| 7,820,321 B2 | 10/2010 | Horne et al. |
| 7,855,015 B1 | 12/2010 | Benson et al. |
| 7,855,020 B1 | 12/2010 | Margiott et al. |
| 7,955,746 B2 | 6/2011 | Fredette |
| 7,976,974 B2 | 7/2011 | Kazacos et al. |
| 8,062,801 B2 | 11/2011 | Moran et al. |
| 8,142,950 B2 | 3/2012 | Reiser et al. |
| 8,587,255 B2 | 11/2013 | Parakulam et al. |
| 9,166,243 B2 | 10/2015 | Perry |
| 9,276,282 B2 | 3/2016 | Zhang et al. |
| 10,044,058 B2 | 8/2018 | Darling et al. |
| 10,680,259 B2 | 6/2020 | Smeltz et al. |
| 2001/0028977 A1 | 10/2001 | Kazacos et al. |
| 2002/0014880 A1 | 2/2002 | McAndrews |
| 2002/0064702 A1 | 5/2002 | Gibb |
| 2002/0086200 A1 | 7/2002 | Margiott |
| 2002/0192513 A1 | 12/2002 | Colbow et al. |
| 2003/0087156 A1 | 5/2003 | Broman et al. |
| 2003/0129468 A1 | 7/2003 | Issacci et al. |
| 2003/0134163 A1 | 7/2003 | Markoski et al. |
| 2004/0028989 A1 | 2/2004 | Sun et al. |
| 2004/0070370 A1 | 4/2004 | Emura |
| 2004/0086763 A1 | 5/2004 | Paddison |
| 2004/0126642 A1 | 7/2004 | Smedley et al. |
| 2004/0151960 A1 | 8/2004 | Rock |
| 2004/0191623 A1 | 9/2004 | Kubata et al. |
| 2004/0202915 A1 | 10/2004 | Nakaishi et al. |
| 2004/0224192 A1 | 11/2004 | Pearson |
| 2004/0241544 A1 | 12/2004 | Nakaishi et al. |
| 2004/0256247 A1 | 12/2004 | Carson et al. |
| 2005/0074649 A1 | 4/2005 | Skiba et al. |
| 2005/0074653 A1 | 4/2005 | Broman et al. |
| 2005/0106450 A1 | 5/2005 | Castro et al. |
| 2005/0136301 A1 | 6/2005 | Knaggs et al. |
| 2005/0158614 A1 | 7/2005 | Hennessy |
| 2005/0244703 A1 | 11/2005 | Osenar et al. |
| 2005/0260473 A1 | 11/2005 | Wang |
| 2006/0003210 A1 | 1/2006 | Ofer et al. |
| 2006/0108214 A1 | 5/2006 | Amendola |
| 2006/0138996 A1 | 6/2006 | Graham et al. |
| 2006/0147795 A1 | 7/2006 | Li et al. |
| 2006/0183016 A1 | 8/2006 | Kazacos et al. |
| 2007/0178359 A1 | 8/2007 | Peng et al. |
| 2008/0115930 A1 | 5/2008 | Peters et al. |
| 2008/0193828 A1 | 8/2008 | Sahu |
| 2008/0274393 A1 | 11/2008 | Markoski et al. |
| 2008/0292938 A1 | 11/2008 | Perry et al. |
| 2009/0071841 A1 | 3/2009 | Pal et al. |
| 2009/0092882 A1 | 4/2009 | Kjeang et al. |
| 2009/0136789 A1 | 5/2009 | Pien et al. |
| 2009/0311567 A1 | 12/2009 | Visco et al. |
| 2010/0003545 A1 | 1/2010 | Horne et al. |
| 2010/0003586 A1 | 1/2010 | Sahu |
| 2010/0047671 A1 | 2/2010 | Chiang et al. |
| 2010/0092813 A1 | 4/2010 | Sahu |
| 2010/0104904 A1 | 4/2010 | Rao et al. |
| 2010/0136455 A1 | 6/2010 | Winter |
| 2010/0143781 A1 | 6/2010 | Keshavarz et al. |
| 2010/0178533 A1 | 7/2010 | Whitehead et al. |
| 2010/0323264 A1 | 12/2010 | Chiang et al. |
| 2010/0330451 A1 | 12/2010 | Shinozaki et al. |
| 2011/0006737 A1 | 1/2011 | Saligram et al. |
| 2011/0008706 A1 | 1/2011 | Cipollini |
| 2011/0020732 A1 | 1/2011 | Darling |
| 2011/0045332 A1 | 2/2011 | Horne et al. |
| 2011/0074357 A1 | 3/2011 | Parakulam et al. |
| 2011/0086247 A1 | 4/2011 | Keshavarz et al. |
| 2011/0087389 A1 | 4/2011 | Burleigh et al. |
| 2011/0117975 A1 | 5/2011 | Dunn et al. |
| 2011/0119005 A1 | 5/2011 | Majima et al. |
| 2011/0123896 A1 | 5/2011 | Jomori et al. |
| 2011/0143249 A1 | 6/2011 | Izawa et al. |
| 2011/0189520 A1 | 8/2011 | Carter et al. |
| 2011/0223450 A1 | 9/2011 | Horne et al. |
| 2011/0223451 A1 | 9/2011 | Winter et al. |
| 2011/0223496 A1 | 9/2011 | Makita et al. |
| 2011/0248653 A1 | 10/2011 | Brotto et al. |
| 2011/0249373 A1 | 10/2011 | Farahmandi |
| 2011/0269055 A1 | 11/2011 | Perry |
| 2011/0274948 A1 | 11/2011 | Duduta et al. |
| 2012/0003562 A1 | 1/2012 | Takehiro et al. |
| 2012/0030886 A1 | 2/2012 | Persson et al. |
| 2012/0045680 A1 | 2/2012 | Dong et al. |
| 2012/0052347 A1 | 3/2012 | Wilson et al. |
| 2012/0100461 A1 | 4/2012 | Iden et al. |
| 2012/0202099 A1 | 8/2012 | Perry et al. |
| 2012/0203392 A1 | 8/2012 | Pandy et al. |
| 2012/0208061 A1 | 8/2012 | Sahu et al. |
| 2012/0220673 A1 | 8/2012 | Browning et al. |
| 2012/0244406 A1 | 9/2012 | Xia et al. |
| 2012/0149573 A1 | 10/2012 | Lomax, Jr. et al. |
| 2012/0247573 A1 | 10/2012 | Lomax, Jr. et al. |
| 2012/0258345 A1 | 10/2012 | Zaffou et al. |
| 2012/0306452 A1 | 12/2012 | Christensen et al. |
| 2012/0308856 A1 | 12/2012 | Horne et al. |
| 2012/0321920 A1 | 12/2012 | Perry et al. |
| 2012/0326672 A1 | 12/2012 | Dennis et al. |
| 2012/0328910 A1 | 12/2012 | la O' et al. |
| 2013/0011704 A1 | 1/2013 | Horne et al. |
| 2013/0022846 A1 | 1/2013 | Liu et al. |
| 2013/0029196 A1 | 1/2013 | Perry et al. |
| 2013/0059189 A1 | 3/2013 | Benham |
| 2013/0084482 A1 | 4/2013 | Chang et al. |
| 2013/0084506 A1 | 4/2013 | Chang et al. |
| 2013/0095362 A1 | 4/2013 | Keshavarz et al. |
| 2013/0136199 A1 | 5/2013 | Wan et al. |
| 2013/0154364 A1 | 6/2013 | Hennessy |
| 2013/0157087 A1 | 6/2013 | Pandy et al. |
| 2013/0157155 A1 | 6/2013 | Park et al. |
| 2013/0217851 A1 | 8/2013 | Federco et al. |
| 2013/0316199 A1 | 11/2013 | Keshavarz et al. |
| 2013/0316268 A1 | 11/2013 | Lee et al. |
| 2014/0030631 A1 | 1/2014 | Esswein et al. |
| 2014/0127542 A1 | 5/2014 | Li et al. |
| 2014/0377687 A1 | 12/2014 | Miyake et al. |
| 2016/0126579 A1 | 5/2016 | Darling et al. |
| 2016/0233531 A1 | 8/2016 | Reece et al. |
| 2020/0006796 A1 | 1/2020 | Su et al. |
| 2020/0044267 A1* | 2/2020 | Perry ............... H01M 8/04798 |

FOREIGN PATENT DOCUMENTS

| | | |
|---|---|---|
| CN | 102354761 | 2/2012 |
| CN | 102859775 | 1/2013 |
| CN | 103000927 | 3/2013 |
| EP | 0517217 | 12/1992 |

(56) References Cited

FOREIGN PATENT DOCUMENTS

| | | |
|---|---|---|
| EP | 2395584 | 12/2011 |
| EP | 2856549 | 4/2015 |
| GB | 1375437 | 11/1974 |
| GB | 2010574 | 6/1979 |
| GB | 2372143 | 8/2002 |
| GB | 2390738 | 1/2004 |
| JP | S54-19228 | 7/1979 |
| JP | 6047373 | 3/1985 |
| JP | 61173468 | 8/1986 |
| JP | 63213261 | 9/1988 |
| JP | 01146267 | 6/1989 |
| JP | 02148659 | 6/1990 |
| JP | H02-148659 | 6/1990 |
| JP | H02195657 | 8/1990 |
| JP | 04-223049 | 8/1992 |
| JP | 7-192748 | 7/1995 |
| JP | H07192748 | 7/1995 |
| JP | 09101286 | 4/1997 |
| JP | 10040944 | 2/1998 |
| JP | 2000030721 | 1/2000 |
| JP | 2002175822 | 6/2002 |
| JP | 2003079070 | 3/2003 |
| JP | 2003157883 | 5/2003 |
| JP | 2003217607 | 7/2003 |
| JP | 2003303611 | 10/2003 |
| JP | 2004519814 | 7/2004 |
| JP | 2005228645 | 8/2005 |
| JP | 2006-156029 | 6/2006 |
| JP | 2006313691 | 11/2006 |
| JP | 2007188729 | 7/2007 |
| JP | 2008166164 | 7/2008 |
| JP | 2008544444 | 12/2008 |
| JP | 2009-283425 | 12/2009 |
| JP | 2010244972 | 10/2010 |
| JP | 2011527509 | 10/2011 |
| JP | 2012164530 | 8/2012 |
| JP | 2014-508384 | 4/2014 |
| JP | 2014098137 | 5/2014 |
| JP | 2015519718 | 7/2015 |
| JP | 2017517101 | 6/2017 |
| KR | 1020060016399 | 2/2006 |
| KR | 20100040606 | 4/2010 |
| WO | 1989005363 | 6/1989 |
| WO | 1989005528 | 6/1989 |
| WO | 9003666 | 4/1990 |
| WO | 9409525 | 4/1994 |
| WO | 9409526 | 4/1994 |
| WO | 0215317 | 2/2002 |
| WO | 03041199 | 5/2003 |
| WO | 03050900 | 6/2003 |
| WO | 2004071967 | 8/2004 |
| WO | 2004079849 | 9/2004 |
| WO | 2005057707 | 6/2005 |
| WO | 2006026585 | 3/2006 |
| WO | 20060135958 | 12/2006 |
| WO | 2007086828 | 8/2007 |
| WO | 20080148148 | 12/2008 |
| WO | 2009017150 | 2/2009 |
| WO | 2010067453 | 6/2010 |
| WO | 2010107429 | 9/2010 |
| WO | 2011075135 | 6/2011 |
| WO | 2012088442 | 6/2012 |
| WO | 20120135473 | 10/2012 |
| WO | 2012160406 | 11/2012 |
| WO | 2012162390 | 11/2012 |
| WO | 2013027076 | 2/2013 |
| WO | 2013018383 | 4/2013 |
| WO | 2013095374 | 6/2013 |
| WO | 2013095378 | 6/2013 |
| WO | 2013131838 | 9/2013 |
| WO | 2013177414 | 11/2013 |
| WO | 2014088601 | 6/2014 |
| WO | 2014098917 | 6/2014 |
| WO | 2013054921 | 4/2015 |
| WO | 2015119272 | 8/2015 |
| WO | 2019139566 | 7/2019 |

OTHER PUBLICATIONS

Skyllas-Kazacos, M., McCann, J., Li, Y., Bao, J., and Tang, A. (2016). The mechanism and modelling of shunt current in the vanadium redox flow battery. Chemistry Select. 2016. pp. 2249-2256.

Luo, X., Lu, Z., Xi, J., Wu, Z., Zhu, W., Chen, L., and Qiu, X. (2005). Influences of permeation of vanadium ions through PVDF-g PSSA membranes on performances of vanadium redox flow batteries. Journal of Physical Chemistry B, 109. 2005. pp. 20310-20314.

Negishi, A. (2003). Redox flow battery. Fuel Cells vol. 2(4). 2003. pp. 69-74.

Selvarani, G., Sahu, A.K., Sridhar, P., Pitchumani, S., and Shukla, A.K. (2008). Effect of diffusion-layer porosity on the performance of polymer electrolyte fuel cells. Journal of Applied Electrochemistry, 38. 2008. 357-362.

Product Sheet. Toray. Electrode base material for fuel cell Physical property table. Retrieved from: http://www.torayca.com/en/lineup/composites/com_009_01.html.

Product Listing. Toray Paper 090—PTFE Treated. FuelCellsEtc: Commercial Fuel Cell Components Manufacturer.

Wang, W.H., Wang, X.D. (2007). Investigation of Ir-modified carbon felt as the positive electrode of an all-vanadium redox flow battery. Electrochimica Acta 52. 2007. pp. 6755-6762.

Weber, A.Z., Mench, M.M., Meyers, J.P., Ross, P.N., Gostick, J.T., and Liu, Q. (2011). Redox flow batteries: A review. Journal of Applied Electrochemistry, 41. 2011. pp 1137-1164.

Wei, X., Nie, Z., Luo, Q., Li, B., Sprenkle, V., Wang, W. (2013). Polyvinyl chloride/silica nanoporous composite separator for all-vanadium redox flow battery applications. Journal of the Electrochemical Society, 160(8). 2013. pp. A1215-A1218.

Yue, L., Li, W., Sun, F., Zhao, L., and Xing, L. (2010). Highly hydroxylated carbon fibres as electrode materials of all-vanadium redox flow battery. Carbon 48. 2010. pp 3079-3090.

Zhou, X.L., Zhao, T.S., An, L., Wei, L., and Zhang, C. (2015). The use of polybenzimidazole membranes in vanadium redox flow batteries leading to increased coulombic efficiency and cycling performance. Electrochimica Acta 153. 2015. pp. 492-498.

Extended European Search Report for European Patent Application No. 19188587.0 dated Jun. 25, 2020.

Partial European Search Report for European Patent Application No. 19188587.0 dated Jan. 8, 2020.

File History for U.S. Appl. No. 13/513,651 now U.S. Pat. No. 9,166,243 issued Oct. 20, 2015.

Certified Translation. Japanese Publication of Examined Patent Application No. S52-102887 published Jul. 13, 1979.

Certified Translation. Japanese Unexamined Patent Application No. H2-148659 published Jun. 7, 1990.

Certified Translation. Japanese Unexamined Patent Application No. 2006-156029 published Jun. 15, 1990.

Linden, D. and Reddy, T.B. Eds. (2002). Handbook of batteries. New York, NY: McGraw-Hill. pp. 37.12, 18-23, 42.3-1 3, 43.11-3, Appendix A.

Laraminie, J. and Dicks, A. (2003). Fuel cell systems explained. Chichester, England: John Wiley & Sons Inc. pp. xv, xvi, 18-9, 88-9, 94-6.

Haar, D. (2016). Dan Haar: United Technologies battery could upend the power business. Hartford Courant. Retrieved Feb. 22, 2017 from: http://www.courant.com/business/dan-haar/hc-haar-united-technologies-battery-for-electric-grid-20160523-column.html.

Aricò, A.S., Cretì, P., Baglio, V., Modica, E., and Antonucci, V. (2000). Influence of flow field design on the performance of a direct methanol fuel cell. Journal of Power Sources vol. 91. 2000 pp. 202-209.

Li, X. and Sabir, I. (2004). Review of bipolar plates in PEM fuel cells: Flow-field designs. International Journal of Hydrogen Energy vol. 30. 2005. pp. 359-371.

(56) References Cited

OTHER PUBLICATIONS

Negishi, A. (2003). Redox flow battery. (Certified Translation). Fuel Cells vol. 2(4). 2003. pp. 69-74.
Yi, J.S., and Nguyen T.V. (1996). Abstract: Hydrodynamics of reactant gas in the electrode of PEM fuel cells with nter-digitated flow fields. The Electrochemical Society, Inc. Meeting Abstracts. Fall Meeting, San Antonio, TX. Oct. 6-11, 1996. p. 974-6.
Kazim, A., Liu, H.T., and Forges, P. (1999). Modelling of performance of PEM fuel cells with conventional and interdigitated flow fields. Journal of Applied Electrochemistry vol. 29(12). 1999. pp. 1409-1416.
Wang, L. and Liu, H. (2004). Performance studies of PEM fuel cells with interdigitated flow fields. Journal of Power Sources vol. 13(2). 2004. pp. 185-196.
Guo, S.M. (2005). The simulation of a PEMFC with an interdigitated flow field design. Computational Science 5th International Conference. May 2005. pp. 104-111.
He, W., Yi, J.S., Nguyen, T.V. (2000). Two-phase flow model of the cathode of PEM fuel ceels using interdigitated flow fields. AIChE Journal vol. 46(10). Oct. 2000. pp. 2053-2064.
Nozaki, K., Hamamoto, O., Kaneko, H., and Ozawa, T. (1975). (Certified Translation). Prospect of power storage using redox flow type secondary battery. Electrochemical/Electro-thermal Study Group Material. The Institute of Electrical Engineers of Japan. Nov. 28, 1975. pp. 1-16.
Declaration of Dr. Toru Kato, Ph D. In re United States Patent Application 9,166,243. Executed Feb. 23, 2017. pp. 1-89.
Prior Art Claim Chart for U.S. Pat. No. 9,166,243.
Ponce de León, C., Frías-Ferrer, A., González-García, Szánto, D.A., and Walsh, F.C. (2006). Redox flow cells for energy conversion. Journal of Power Sources vol. 160. 2006. pp 716-732.
Nozaki, K., Hamamoto, O., Kaneko, H., and Ozawa, T. (1975). Prospect of power storage using redox flow type secondary battery. Electrochemical/Electro-thermal Study Group Material. The Institute of Electrical Engineers of Japan. Nov. 28, 1975. pp. 1-16.
Shigematsu, T. (2011). Redox flow battery for energy storage. SEI Technical Review No. 73. Oct. 2011. pp. 4-13.
Tokuda, N., Kanno, T., Hara, T., Shigematsu, T., Tsutsui, Y., Ikeuchi, A., Itou, T., et al. (2000). Development of a redox flow battery system. SEI Technical Review No. 73. Jun. 2000. pp. 88-94.
Hagedorn, N.H. (1984). NASA redox storage system development project. Final Report. DOE/NASA/12726-24. Oct. 1984. pp. 1-43.
Sumitomo Electric. Redox Flow Battery. Technical Document. Retrieved May 8, 2017 from: http://global-sei.com/products/redox/pdf/redox-flow-battery.pdf.
Petition for Inter Partes Review of U.S. Pat. No. 9,166,243. *Sumitomo Electric Industries, Ltd.,* Petitioner, v. *United Technologies Corporation,* Patent Owner. Filed Feb. 23, 2017.
Final Written Decision. *Sumitomo Electric Industries, Ltd.,* Petitioner, v. *United Technologies Corporation,* Patent Owner IPR2017-00966. U.S. Pat. No. 9,166,243 Entered Sep. 12, 2018. pp. 1-33.

\* cited by examiner

REDOX FLOW BATTERY WITH IMPROVED EFFICIENCY

STATEMENT REGARDING FEDERALLY SPONSORED RESEARCH OR DEVELOPMENT

This invention was made with government support under Contract No. DE-AR000994, awarded by the Department of Energy. The Government has certain rights in this invention.

BACKGROUND

Flow batteries, also known as redox flow batteries or redox flow cells, are designed to convert electrical energy into chemical energy that can be stored and later released back into electrical energy when there is demand. As an example, a flow battery may be used with a renewable energy system, such as a wind-powered system, to store energy that exceeds consumer demand and later release that energy when there is greater demand.

A typical flow battery includes a redox flow cell that has a negative electrode and a positive electrode separated by an electrolyte layer, which may include a separator, such as an ion-exchange membrane. A negative fluid electrolyte (sometimes referred to as the anolyte or negolyte) is delivered to the negative electrode and a positive fluid electrolyte (sometimes referred to as the catholyte or posolyte) is delivered to the positive electrode to drive reversible redox reactions between redox pairs. Upon charging, the electrical energy supplied causes a reduction reaction in one electrolyte and an oxidation reaction in the other electrolyte. The separator prevents the electrolytes from freely and rapidly mixing but selectively permits ions to pass through to complete the redox reactions. Upon discharge, the chemical energy contained in the liquid electrolytes is released in the reverse reactions and electrical energy is drawn from the electrodes.

SUMMARY

A method for a redox flow battery according to an exemplary embodiment of this disclosure, among other possible things includes using a cell of a redox flow battery to store input electrical energy upon charging and discharge the stored electrical energy upon discharging. The cell has a separator layer arranged between first and second electrodes. The using includes circulating a first electrolyte solution through a first circulation loop in fluid connection with the first electrode of the cell; circulating a second electrolyte solution through a second circulation loop in fluid connection with the second electrode of the cell; and at least one of a first element from the first electrolyte solution in the first electrode permeates through the separator layer and precipitates as a first solid product in the second electrode and a second element from the second electrolyte solution permeates through the separator layer and precipitates a second solid product in the first electrode, removing at least a portion of the first solid product or the second solid product from the first electrode and the second electrode, respectively, by circulating at least a portion of the first electrolyte solution from the first circulation loop through the second electrode to dissolve, and thereby remove, at least a portion of the first solid product from the second electrode, circulating at least a portion of the second electrolyte solution from the second circulation loop through the first electrode to dissolve, and thereby remove, at least a portion of the second solid product from the first electrode, or both. The using results in a decrease in voltaic efficiency. The removing recovers at least a portion of the decrease in voltaic efficiency.

In a further example of the foregoing, at least one of the first solid product and second solid product precipitates onto the separator layer.

In a further example of any of the foregoing, at least a portion of the first solid product is removed from the separator layer by the step of circulating at least a portion of the first electrolyte solution from the first circulation loop through the second electrode.

In a further example of any of the foregoing, at least a portion of the second solid product is removed from the separator layer by the step of circulating at least a portion of the second electrolyte solution from the second circulation loop through the first electrode.

In a further example of any of the foregoing, at least one of the first and second solid products are clogged in the separator layer.

In a further example of any of the foregoing, at least a portion of the first solid product is removed from the separator layer by the step of circulating at least a portion of the first electrolyte solution from the first circulation loop through the second electrode.

In a further example of any of the foregoing, at least a portion of the second solid product is removed from the separator layer by the step of circulating at least a portion of the second electrolyte solution from the second circulation loop through the first electrode.

In a further example of any of the foregoing, the steps of circulating at least a portion of the first electrolyte solution from the first circulation loop through the second electrode and circulating at least a portion of the second electrolyte solution from the second circulation loop through the first electrode are performed sequentially.

In a further example of any of the foregoing, the method includes the steps of draining the first electrolyte solution to a first tank and draining the second electrolyte solution to a second tank prior to circulating at least a portion of the first electrolyte solution from the first circulation loop through the second electrode and circulating at least a portion of the second electrolyte solution from the second circulation loop through the first electrode.

A method for a redox flow battery according to an exemplary embodiment of this disclosure, among other possible things includes using a cell of a redox flow battery to store input electrical energy upon charging and discharge the stored electrical energy upon discharging. The cell has a separator layer arranged between first and second electrodes. The using includes circulating a polysulfide electrolyte solution through a first circulation loop in fluid connection with the first electrode of the cell; circulating a manganese electrolyte solution through a second circulation loop in fluid connection with the second electrode of the cell; and at least one of sulfur from the polysulfide electrolyte solution in the first electrode permeates through the separator layer and precipitates as a solid sulfur-containing product and manganese from the manganese electrolyte solution permeates through the separator layer and precipitates as solid manganese-containing product, removing at least a portion of the solid sulfur product or the solid manganese product from the separator layer or opposing electrode, by circulating at least a portion of the polysulfide electrolyte solution from the first circulation loop through the second electrode to dissolve, and thereby remove, at least a portion of the solid sulfide product from the separator layer, circulating at least a portion of the manganese electrolyte solution from the second circulation loop through the first electrode to dissolve, and thereby remove, at least a portion of solid manganese product from the separator layer, or both.

In a further example of the foregoing, the method includes passing the polysulfide electrolyte solution with the dissolved solid sulfide product in a first direction through a bi-directional filter and passing the manganese electrolyte solution with the dissolved solid manganese product in a second, opposite direction through the bi-directional filter.

In a further example of any of the foregoing, at least one of the solid sulfur product and the solid manganese product precipitates onto the separator layer.

In a further example of any of the foregoing, at least one of the solid sulfur product and the solid manganese product decreases porosity of the separator layer.

In a further example of any of the foregoing, the method includes the steps of draining the polysulfide electrolyte to a first tank and draining the manganese electrolyte solution to a second tank prior to circulating at least a portion of the polysulfide electrolyte solution from the first circulation loop through the second electrode and circulating at least a portion of the manganese electrolyte solution from the second circulation loop through the first electrode.

In a further example of any of the foregoing, the method includes draining the polysulfide electrolyte solution to the first tank after the step of circulating at least a portion of the polysulfide electrolyte solution from the first circulation loop through the second electrode and prior to the step of circulating at least a portion of the manganese electrolyte solution from the second circulation loop through the first electrode.

In a further example of any of the foregoing, wherein the step of circulating at least a portion of the polysulfide electrolyte solution from the first circulation loop through the second electrode results in removing at least a portion of solid sulfur product from the second electrode.

In a further example of any of the foregoing, circulating at least a portion of the manganese electrolyte solution from the second circulation loop through the first electrode results in removing at least a portion of solid manganese product from the first electrode.

In a further example of any of the foregoing, the steps of circulating at least a portion of the polysulfide electrolyte solution from the first circulation loop through the second electrode and circulating at least a portion of the manganese electrolyte solution from the second circulation loop through the first electrode are performed sequentially.

In a further example of any of the foregoing, after the steps of circulating at least a portion of the polysulfide electrolyte solution from the first circulation loop through the second electrode and circulating at least a portion of the manganese electrolyte solution from the second circulation loop through the first electrode, at least 25% of a decrease in voltaic efficiency that resulted from operation.

A redox flow battery according to an exemplary embodiment of this disclosure, among other possible things includes a cell having first and second electrodes and an ion-exchange layer arranged between the first and second electrodes; a first circulation loop fluidly connected with the first electrode; a polysulfide electrolyte contained in the first recirculation loop; a second circulation loop fluidly connected with the second electrode; a manganese electrolyte contained in the second circulation loop; a bi-directional filter; and a first auxiliary loop connecting the first circulation loop with the second electrode through the bi-directional filter, the first auxiliary loop configured to receive flow of the polysulfide electrolyte. Flow of the polysulfide electrolyte through the first auxiliary loop removes solid sulfur product from at least one of the ion exchange layer and the second electrode. The redox flow battery also includes a second auxiliary loop connecting the second circulation loop with the first electrode through the bi-directional filter, the second auxiliary loop configured to receive flow of the manganese electrolyte. Flow of the manganese electrolyte through the second auxiliary loop removes solid manganese product from at least one of the ion exchange layer and the first electrode.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Redox flow batteries ("RFB") utilize electrochemically active species that include ions of elements that have multiple, reversible oxidation states in a selected liquid solution. Example species may include transition metals, such as vanadium, iron, manganese, chromium, zinc, or molybdenum, or other elements such as sulfur, cerium, lead, tin, titanium, germanium, bromine, or chlorine. Although these species have been used, not all of them are compatible for use together. For instance, over time, there is mixing of species due to cross-over of the species through the separator. If incompatible, the cross-over species may react to precipitate as an insoluble solid that could collect within the RFB and negatively affect performance of the RFB.

Figure 1:
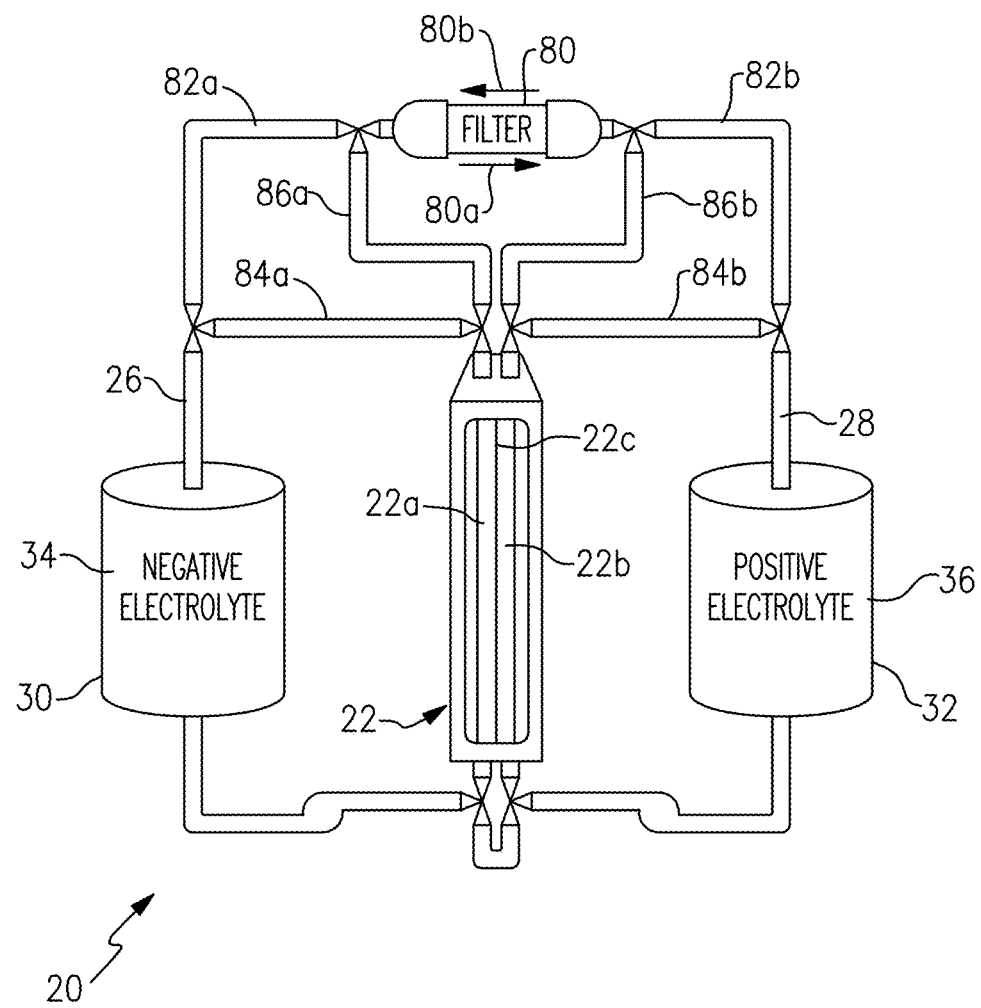
FIG. 1 illustrates an example redox flow battery.

FIG. 1 schematically shows an example RFB 20. The RFB 20 in this example includes a single, common cell 22 or stack of common cells, though in other examples multiple cells could be used. The cell 22 includes a first electrode 22a, a second electrode 22b, and an ion-selective separator layer 22c between the electrodes 22a and 22b. For example, the electrodes 22a, 22b may be porous carbon structures, such as carbon paper or felt. The separator layers may be an ion-selective separator layer 22c, which permits selected ions to pass through to complete the redox reactions while electrically isolating the electrodes.

A first circulation loop 26 is fluidly connected with the first electrode 22a of the cell 22, and a second circulation loop 28 is fluidly connected with the second electrode 22b of the cell 22. As used herein, a "loop" refers to a continuous, closed circuit fluid passage. The first circulation loop 26 and the second circulation loop 28 may include respective electrolyte storage tanks 30 and 32. The negative electrolyte solution 34 is contained in the first recirculation loop 26 (i.e., fluidly connected to the tank 30), and a positive electrolyte solution 36 is contained in the second circulation loop 28 (i.e., fluidly connected to the tank 32).

The RFB 20 includes a first electrolyte 22 that has at least one electrochemically active species 24 that functions in a redox pair with regard to a second electrolyte 26 that has at least one electrochemically active species 28. As will be appreciated, the terminology "first" and "second" is to differentiate that there are two distinct electrolytes/electrodes. It is to be further understood that terms "first" and "second" are interchangeable in that the first electrolyte/electrode could alternatively be termed as the second electrolyte/electrode, and vice versa.

As noted above, a variety of electrochemically active species can be used in the RFB 20. One example set of species that may be used in RFBs as the first and second electrolytes 34/36 are sulfur and manganese, respectively. In this example, a polysulfide electrolyte solution 34 is contained in the first recirculation loop 26 (i.e., fluidly connected to the tank 30), and a manganese electrolyte solution 36 is contained in the second circulation loop 28 (i.e., fluidly connected to the tank 32). The polysulfide electrolyte solution 34 has a pH greater than 12, and the manganese electrolyte solution has a pH greater than 14. The electrolytes shown in the figures and described herein are illustrative only, and this description is not limited to any particular electrolyte chemistry.

The polysulfide in the polysulfide electrolyte solution 34 generally refers to salts of sulfur in a basic pH solution. For example, the salt is sodium salt with the formula $Na_2S_x$, where x is 1 to 8, in sodium hydroxide. In one example, the polysulfide electrolyte solution 34 may be 1M $Na_2S_x$ in 7.5M sodium hydroxide. The manganese in the electrolyte solution 36 generally refers to permanganate or manganate salts in an alkaline, or basic, solution. In one example, the manganese electrolyte solution 36 may be 1M sodium permanganate ($NaMnO_4$) in 7.5 M sodium hydroxide (NaOH) or in another example 2M $NaMnO_4$ in 3M NaOH.

The polysulfide electrolyte solution 34 circulates through the first electrode 22a and the manganese electrolyte solution 36 circulates through the second electrode 22b.

The following equations demonstrate example reactions in the cell 22, as well as the resulting standard electrode potential (E°) versus Standard Hydrogen Electrode (SHE) and Open Cell Voltage (OCV), which is defined herein as the difference between the standard electrode potentials of the two electrode reactions.

Negative: 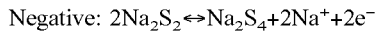
E°=−0.492 vs. SHE
Positive: 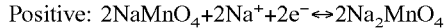
E°=+0.564 vs. SHE
Net cell: 
OCV=1.06 V During operation of the RFB 20, sulfur may cross over from the first electrode 22a through the ion-selective separator layer 22c to the second electrode 22b. The sulfur precipitates as a solid sulfur or manganese-sulfur species. Furthermore, the crossed-over sulfur species can reduce permanganate and manganate species to manganese species that disproportionate into solid manganese oxide species ($Mn_yO_z$). Permanganate and manganate species may likewise cross over from the second electrode 22b into the low potential sulfur electrolyte 34 in the first electrode 22a and reduce to form insoluble manganate hydroxide $Mn(OH)_2$, $MnO_yO_z$ species, or manganese sulfur species. Over time, the loss of sulfur and manganese species, and clogging from the insoluble sulfur and manganese species could reduce round-trip efficiency to unfeasible levels for use as an RFB. Polysulfide and manganese electrolyte solutions would therefore be generally incompatible in RFBs.

Figure 2:
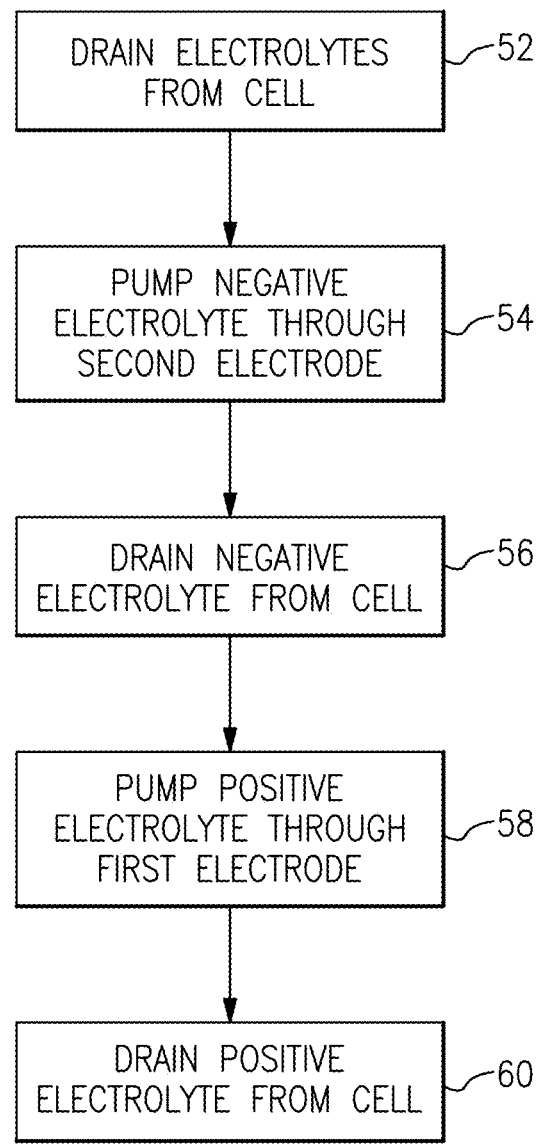
FIG. 2 illustrates a method for cleaning the redox flow battery of FIG. 1.

However, an electrolyte takeover method (ETM) 50, shown in FIG. 2, can be used to clean/maintain the RFB 20, e.g., reduce/minimize the presence of solid precipitates in the electrodes 22a/22b and/or ion-selective separator layer 22c. With continued reference to FIGS. 1 and 2, the method 50 generally includes draining the electrolytes 34/36 from the cell 22 into their respective tanks 30/32 at step 52. At step 54, the negative (e.g., polysulfide) electrolyte solution 34 is pumped through the second electrode 22b, via connector 84a, which reduces, dissolves, and recaptures any solids, such as S°, that have a propensity to dissolve when they are exposed to the reducing (e.g., polysulfide) solution. The negative (e.g., polysulfide) electrolyte solution 34 is passed through connector 86b through a bi-directional filter 80 (to capture any residual solids such as Mn that precipitates) in a direction 80b and back to the polysulfide solution reservoir via a first auxiliary loop 82a.

At step 56, the negative (e.g., polysulfide) electrolyte solution 34 is drained back to the tank 30. Then, in step 58, the positive (e.g., manganese) electrolyte solution 36 is pumped through first electrode 22a (after draining) via connector 84a, which oxidizes and dissolves any solids, such as $Mn(OH)_2$ or manganese oxide precipitate. The manganese electrolyte solution 36 is routed through connector 86a to the same bi-directional filter 80 (to capture any residual solids such as S that precipitates) and passed in a second direction 80a but as a part of a second auxiliary loop 82b. The bi-directional filter 80 enables recapture of precipitated species that are filtered out to be recaptured in the negative (e.g., polysulfide) electrolyte solution 34 and the positive (e.g., manganese) electrolyte solution 36. At step 60, the positive (e.g., manganese) electrolyte solution 36 is drained back to the tank 52. The electrolytes 34/36 can then be reintroduced into the cell for normal RFB 20 operation.

It should be understood that in some examples, steps 58-60 and 54-56 are switched, or only one of the two is performed.

Once the solid products such as the sulfur and/or manganese products have been removed to a desired level, the negative electrolyte solution 34 is then transferred back into the first loop 26 and the positive electrolyte solution 36 is transferred back into the second loop 28.

Figure 3B:
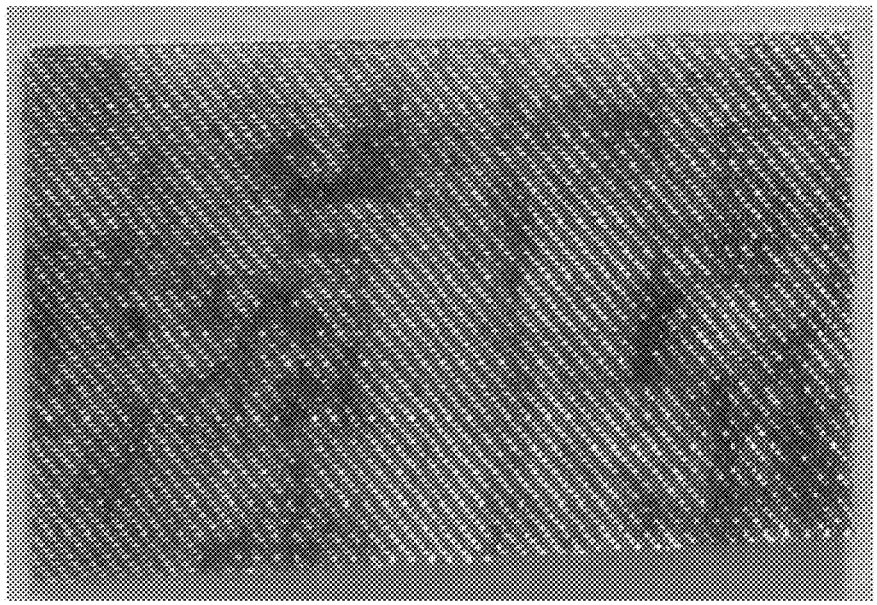
FIGS. 3a-b show images of an electrode of the example redox flow battery of FIG. 1 before and after performing the method of FIG. 2, respectively.
Figure 3A:
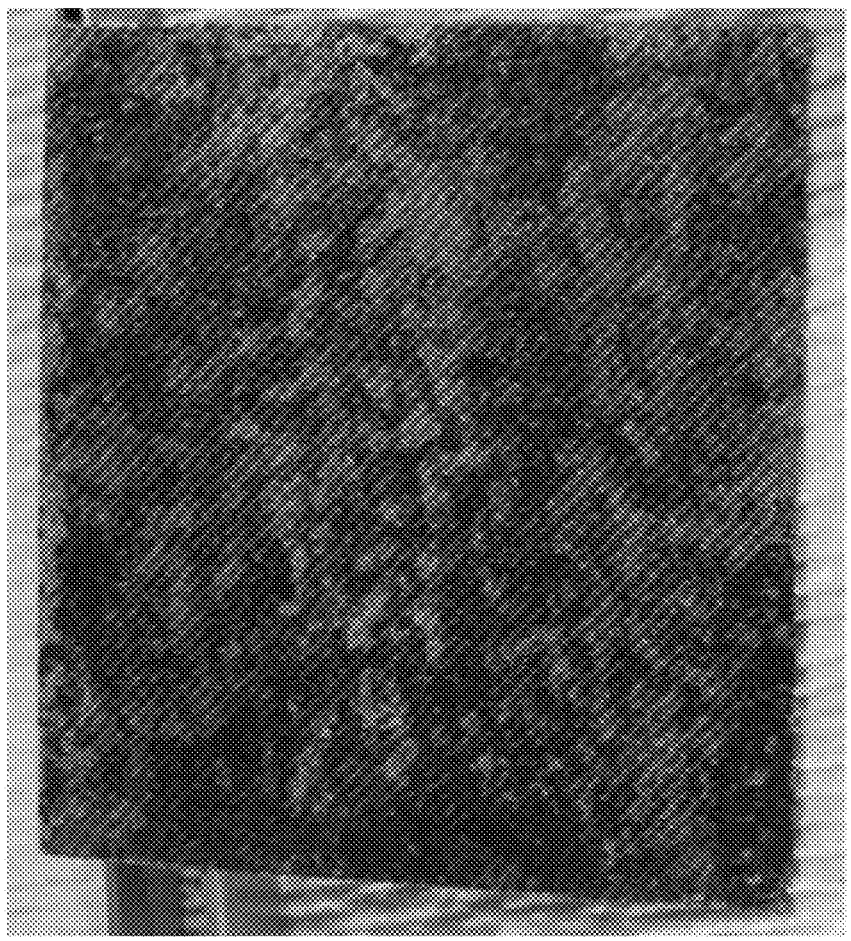
Figure 4B:
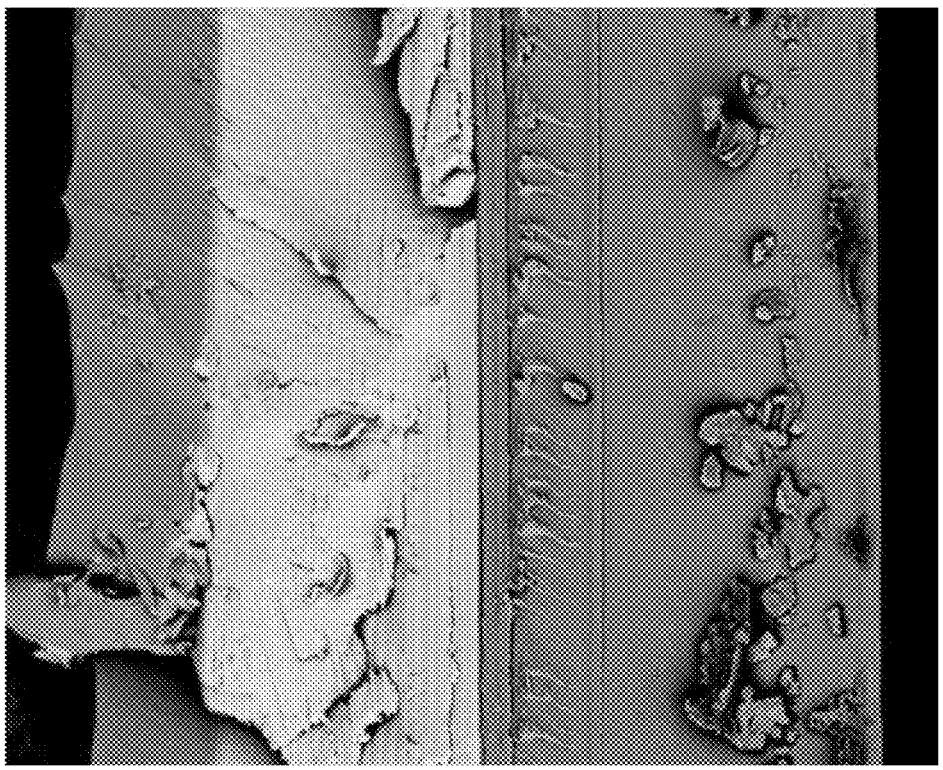
FIGS. 4a-b show images of a cross section of an example separator layer of the example redox flow battery of FIG. 1 before and after performing the method of FIG. 2, respectively.
Figure 4A:
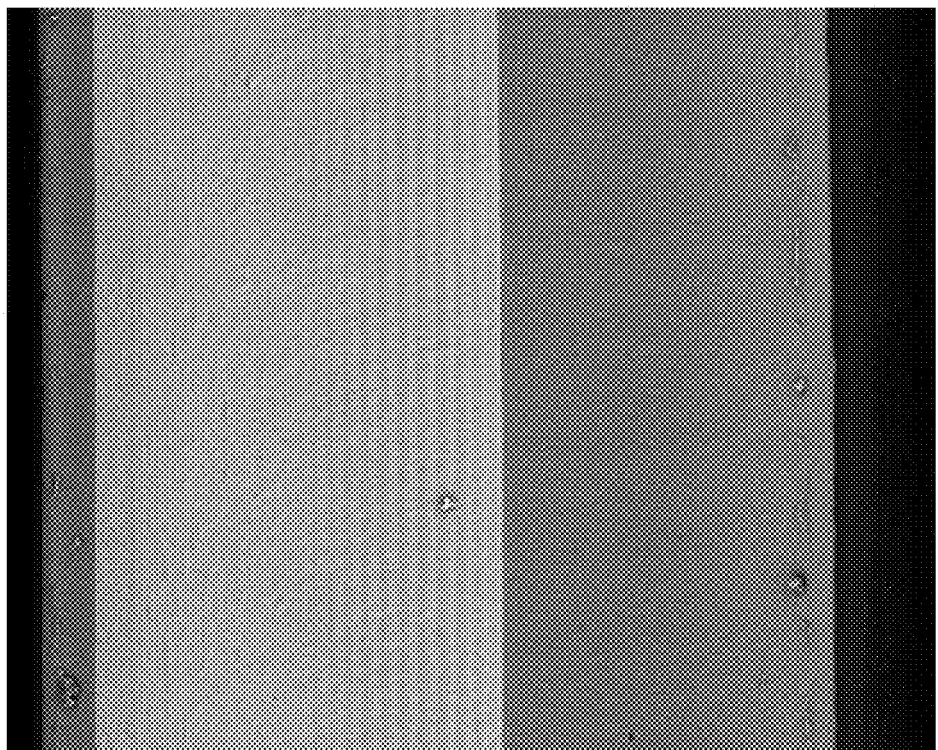

It has been discovered via imaging performed after conducting the ETM method 50 on electrodes 22a/22b and ion-selective separator layer 22c that the ETM method 50 reduced the amount of solid precipitate on the electrodes 22a/22b and ion-selective separator layer 22c. FIGS. 3a-b show images of an electrode 22a/22b before and after performing the ETM method described above. As shown, the ETM method reduced the amount of solid precipitate buildup in the electrode 22a/22b. FIGS. 4a-b show images of a cross section of an example ion-selective separator layer 22c, which in this example is a PFSA membrane (perfluorosulfonic acid membrane), before and after performing the ETM method described above, respectively. In FIGS. 4a-b, the lightest band indicates a manganese-rich region. As shown in FIG. 4b, the lightest band has a decreased thickness compared to the corresponding band in FIG. 4a, meaning the ETM method reduced the amount of manganese in the ion-selective separator layer 22c.

Without being bound by any particular theory, removing the solid sulfur and manganese species according to the ETM method 50 discussed above improves the efficiency and longevity of the RFB 20 in one or both of the following ways. Solid species that become trapped on the electrodes 22a/22b can block the active species in the electrolytes 34/36 from reaching sites on the electrodes 22a/22b, which is what facilitates the reactions discussed above in the RFB 20. Accordingly, reducing the amount of solid precipitate buildup on the electrodes 22a/22b facilitates more reactions to occur at the electrodes 22a/22b. Moreover, solids that become clogged in the ion-selective separator layer 22c can reduce porosity of the membrane 22c and thereby inhibit ion exchange to balance the reactions described above, which occurs through the membrane 22c. Solids could become clogged in the ion-selective separator layer 22c by precipitating directly onto the ion-selective separator layer 22c or by encountering the ion-selective separator layer 22c from the electrodes 22a/b. Similarly, then, reducing the amount of solid precipitate buildup in or on the ion-selective separator layer 22c facilitates ion exchange, which limits cell resistance for the RFB 20.

Efficiency of the RFB 20 can be expressed as a voltaic efficiency, which is the ratio of the average discharge voltage to the average charge voltage of the RFB 20. Operation of the RFB 20 results in a reduction of voltaic efficiency over time. In one example, a single pass of the ETM method 50 results in at least 25% recovery of the decrease in voltaic efficiency over the preceding cycles since starting the RFB or the last ETM. The improved voltaic efficiency of the RFB 20 is attributable to the decrease in the amount of solid precipitate on the electrodes 22a/22b and/or ion-selective separator layer 22c, as discussed above.

If the solids that result from electrolyte crossover collect in the tanks 30 or 32, then these solids could be periodically removed from bottom reservoirs of the tanks 30 or 32 (the solids have significantly higher densities than the liquids and thus sink). It is expected that this process would not need to be done often, if at all, and does not need to be fully automated (i.e., this could be part of annual maintenance procedures). Solids recovered from the filter 80 and/or tanks 30/32 could be recycled, e.g., provided back to the respective electrolytes 34/36, in some examples, which can replenish the electrolyte 34/36 capacity with the RFB. However, in other examples, the solids are not recycled.

Disproportionation reactions are a possibility, since Mn has a large number of oxidation states. If manganate disproportionates to $Mn(V)O_4^{3-}$, the compound rapidly decomposes and precipitates to $MnO_2$, but under strongly alkaline conditions, this disproportionation reaction is less of a concern (i.e., pH≥14). However, at high concentrations of NaOH, the following reaction can occur slowly:

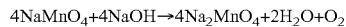

Further reduction of manganate(VI) does not occur. The reaction is slow; measurements with a 4 M solution of $MnO_4^-$ in 7.5M $OH^-$ indicate a capacity retention of 80% after 1 month of storage of a fully charged solution. Nevertheless, this reaction will result in a permanent capacity loss, unless a mitigation strategy, such as one described below, is employed. Oxygen generation is also a concern since the reversible potential of the manganese couple is 157 mV higher than E° for $O_2$ evolution (0.401 V vs. SHE) at pH=14. Therefore, the positive electrode material must be chosen to minimize catalysis of $O_2$ evolution. $H_2$ evolution is not a concern because the reversible potential for polysulfide is above E° for $H_2$ evolution.

Small amounts of $O_2$ evolved from the disproportionation reaction, or produced by the oxygen-evolution reaction in the positive electrode, can lead to electrolyte imbalance and result in energy capacity fade in the RFB. In this case, $O_2$ can be consumed by allowing it to react with the negolyte by connecting the gas space above the posolyte and negolyte reservoirs (this gas space is maintained as a $N_2$ blanket to prevent discharge of the anolyte):

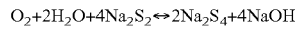

The net of this reaction and the one above is a discharge of both electrolytes, but it results in the electrolytes being maintained at a constant composition. Another result of these reactions will be an increase of the pH of polysulfide electrolyte solution 34 and a decrease in the manganese electrolyte solution 36, but changes in water concentrations and [$OH^-$] can be offset eventually by diffusion through the membrane or by active measures.

Though the foregoing description is made with respect to an RFB 20 that employs a sulfur/manganese chemistry, it should be understood that the ETM method 50 described above could also be applicable to RFBs that employ different chemistries, even if the solids are formed for reasons other than those discussed above. For example, aqueous vanadium chemistry, which is known in the art, can form precipitates at high ambient temperatures (typically in the positive electrolyte) or at low ambient temperatures (typically in the negative electrolyte), which can be re-dissolved using the ETM method 50. Other example chemistries for which the ETM method 50 could be employed are Fe/Cr or Ti/Mn chemistry, both of which are in known in the art. In these examples, metal plating on the negative electrode is a particular concern, and can be mitigated by exposing the materials to oxidative positive electrolyte using the ETM method 50. Oxidative electrolytes can also eliminate filming cause by ligands in metal-ligand chemistries.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

The invention claimed is:

1. A method for a redox flow battery, the method comprising:
    using a cell of a redox flow battery to store input electrical energy upon charging and discharge the stored electrical energy upon discharging,
        wherein the cell has a separator layer arranged between a first electrode and a second electrode,
        wherein the using includes
        circulating a first electrolyte solution through a first circulation loop in fluid connection with the first electrode of the cell,
        circulating a second electrolyte solution through a second circulation loop in fluid connection with the second electrode of the cell, and wherein
        at least one of a first element from the first electrolyte solution in the first electrode permeates through the separator layer and precipitates as a first solid product in the second electrode and a second element from the second electrolyte solution permeates through the separator layer and precipitates a second solid product in the first electrode;

removing at least a portion of the first solid product or a portion of the second solid product from the first electrode and the second electrode, respectively, by circulating at least a portion of the first electrolyte solution from the first circulation loop through the second electrode to dissolve, and thereby remove, at least a portion of the first solid product from the second electrode, circulating at least a portion of the second electrolyte solution from the second circulation loop through the first electrode to dissolve, and thereby remove, at least a portion of the second solid product from the first electrode, or both;

wherein the using results in a decrease in voltaic efficiency, and wherein the removing recovers at least some of the decrease in voltaic efficiency.

2. The method as recited in claim 1, wherein at least one of the first solid product and second solid product precipitates onto the separator layer.

3. The method as recited in claim 2, wherein at least a portion of the first solid product is removed from the separator layer by the step of circulating at least a portion of the first electrolyte solution from the first circulation loop through the second electrode.

4. The method as recited in claim 2, wherein at least a portion of the second solid product is removed from the separator layer by the step of circulating at least a portion of the second electrolyte solution from the second circulation loop through the first electrode.

5. The method as recited in claim 1, wherein at least one of the first and second solid products are clogged in the separator layer.

6. The method as recited in claim 5, wherein at least a portion of the first solid product is removed from the separator layer by the step of circulating at least a portion of the first electrolyte solution from the first circulation loop through the second electrode.

7. The method as recited in claim 5, wherein at least a portion of the second solid product is removed from the separator layer by the step of circulating at least a portion of the second electrolyte solution from the second circulation loop through the first electrode.

8. The method as recited in claim 1, wherein the steps of circulating at least a portion of the first electrolyte solution from the first circulation loop through the second electrode and circulating at least a portion of the second electrolyte solution from the second circulation loop through the first electrode are performed sequentially.

9. The method as recited in claim 1, further comprising the steps of draining the first electrolyte solution to a first tank and draining the second electrolyte solution to a second tank prior to circulating at least a portion of the first electrolyte solution from the first circulation loop through the second electrode and circulating at least a portion of the second electrolyte solution from the second circulation loop through the first electrode.

10. A method for a redox flow battery, the method comprising:

using a cell of a redox flow battery to store input electrical energy upon charging and to discharge the stored electrical energy upon discharging, wherein the cell has a separator layer arranged between a first electrode and a second electrode, wherein the using includes circulating a polysulfide electrolyte solution through a first circulation loop in fluid connection with the first electrode of the cell, circulating a manganese electrolyte solution through a second circulation loop in fluid connection with the second electrode of the cell, and wherein at least one of sulfur from the polysulfide electrolyte solution in the first electrode permeates through the separator layer and precipitates as a solid sulfur-containing product and manganese from the manganese electrolyte solution permeates through the separator layer and precipitates as solid manganese-containing product;

removing at least a portion of the solid sulfur product or the solid manganese product from the separator layer or opposing electrode, by circulating at least a portion of the polysulfide electrolyte solution from the first circulation loop through the second electrode to dissolve, and thereby remove, at least a portion of the solid sulfide product from the separator layer, circulating at least a portion of the manganese electrolyte solution from the second circulation loop through the first electrode to dissolve, and thereby remove, at least a portion the solid manganese product from the separator layer, or both.

11. The method as recited in claim 10, further comprising passing the polysulfide electrolyte solution with the dissolved solid sulfide product in a first direction through a bi-directional filter and passing the manganese electrolyte solution with the dissolved solid manganese product in a second, opposite direction through the bi-directional filter.

12. The method as recited in claim 10, wherein at least one of the solid sulfur product and the solid manganese product precipitates onto the separator layer.

13. The method as recited in claim 10, wherein at least one of the solid sulfur product and the solid manganese product decreases porosity of the separator layer.

14. The method as recited in claim 10, further comprising the steps of draining the polysulfide electrolyte to a first tank and draining the manganese electrolyte solution to a second tank prior to circulating at least a portion of the polysulfide electrolyte solution from the first circulation loop through the second electrode and circulating at least a portion of the manganese electrolyte solution from the second circulation loop through the first electrode.

15. The method as recited in claim 14, further comprising draining the polysulfide electrolyte solution to the first tank after the step of circulating at least a portion of the polysulfide electrolyte solution from the first circulation loop through the second electrode and prior to the step of circulating at least a portion of the manganese electrolyte solution from the second circulation loop through the first electrode.

16. The method as recited in claim 10, wherein the step of circulating at least a portion of the polysulfide electrolyte solution from the first circulation loop through the second electrode results in removing at least some solid sulfur product from the second electrode.

17. The method as recited in claim 10, wherein circulating at least a portion of the manganese electrolyte solution from the second circulation loop through the first electrode results in removing at least some solid manganese product from the first electrode.

18. The method as recited in claim 10, wherein the steps of circulating at least a portion of the polysulfide electrolyte solution from the first circulation loop through the second electrode and circulating at least a portion of the manganese electrolyte solution from the second circulation loop through the first electrode are performed sequentially.

19. The method as recited in claim 10, wherein after the steps of circulating at least a portion of the polysulfide electrolyte solution from the first circulation loop through the second electrode and circulating at least a portion of the manganese electrolyte solution from the second circulation loop through the first electrode, at least 25% of a decrease in voltaic efficiency that resulted from operation.

20. A redox flow battery comprising:
- a cell having a first electrode, a second electrode, and an ion-exchange layer arranged between the first electrode and the second electrode;
- a first circulation loop fluidly connected with the first electrode;
- a polysulfide electrolyte contained in the first circulation loop
- a second circulation loop fluidly connected with the second electrode;
- a manganese electrolyte contained in the second circulation loop;
- a bi-directional filter;
- a first auxiliary loop connecting the first circulation loop with the second electrode through the bi-directional filter, the first auxiliary loop configured to receive flow of the polysulfide electrolyte, wherein flow of the polysulfide electrolyte through the first auxiliary loop removes solid sulfur product from at least one of the ion exchange layer and the second electrode; and
- a second auxiliary loop connecting the second circulation loop with the first electrode through the bi-directional filter, the second auxiliary loop configured to receive flow of the manganese electrolyte, wherein flow of the manganese electrolyte through the second auxiliary loop removes solid manganese product from at least one of the ion exchange layer and the first electrode.

* * * * *